United States Patent [19]

Job

[11] Patent Number: 5,118,649
[45] Date of Patent: Jun. 2, 1992

[54] PROCESS FOR THE PRODUCTION OF ELASTOMERIC PRIMARILY ISOTACTIC POLYOLEFINS AND CATALYSTS FOR USE IN SAID PROCESS

[75] Inventor: Robert C. Job, Houston, Tex.

[73] Assignee: Shell Oil Company, Houston, Tex.

[21] Appl. No.: 772,171

[22] Filed: Oct. 7, 1991

Related U.S. Application Data

[62] Division of Ser. No. 484,314, Feb. 26, 1990, Pat. No. 5,089,573.

[51] Int. Cl.⁵ .............................................. C08F 4/649
[52] U.S. Cl. .................................. 502/124; 502/121; 526/124
[58] Field of Search ........................... 502/121, 124

[56] References Cited

U.S. PATENT DOCUMENTS

| | | | |
|---|---|---|---|
| 3,112,300 | 11/1963 | Natta et al. | 260/93.7 |
| 3,112,301 | 11/1963 | Natta et al. | 260/93.7 |
| 3,175,999 | 3/1965 | Natta et al. | 260/93.7 |
| 3,240,773 | 3/1966 | Boor | 260/93.7 |
| 3,257,370 | 6/1966 | Natta et al. | 260/93.7 |
| 3,258,455 | 6/1966 | Natta et al. | 260/93.7 |
| 3,305,538 | 2/1967 | Natta et al. | 260/93.7 |
| 3,329,741 | 7/1967 | Schrage et al. | 260/878 |
| 3,335,121 | 8/1967 | Natta et al. | 260/93.7 |
| 3,364,190 | 1/1968 | Emrick | 260/93.7 |
| 3,534,006 | 10/1970 | Kamaishi et al. | 260/80.78 |
| 3,932,307 | 1/1976 | Setterquist | 252/430 |
| 3,950,269 | 4/1976 | Setterquist | 252/430 |
| 3,971,767 | 7/1976 | Setterquist | 526/65 |
| 4,011,383 | 3/1977 | Setterquist | 526/154 |
| 4,017,525 | 4/1977 | Setterquist | 260/429.3 |
| 4,072,809 | 2/1978 | Rogan | 526/136 |
| 4,136,243 | 1/1979 | Appleyard et al. | 526/139 |
| 4,226,963 | 10/1980 | Giannini et al. | 526/114 |
| 4,255,281 | 3/1981 | Rogan et al. | 252/429 B |
| 4,310,439 | 1/1982 | Langer | 252/429 B |
| 4,317,898 | 3/1982 | Karayannis et al. | 526/141 |
| 4,325,836 | 4/1982 | Epstein et al. | 252/429 B |
| 4,329,253 | 5/1982 | Goodall et al. | 252/429 B |
| 4,335,225 | 6/1982 | Collette et al. | 525/240 |
| 4,336,360 | 6/1982 | Giannini et al. | 526/114 |
| 4,347,160 | 8/1982 | Epstein et al. | 252/429 B |
| 4,393,182 | 7/1983 | Goodall et al. | 526/125 |
| 4,394,291 | 7/1983 | Hawley | 252/429 B |
| 4,442,276 | 4/1984 | Kashiwa et al. | 526/125 |
| 4,487,845 | 12/1984 | Triplett | 502/107 |
| 4,581,342 | 4/1986 | Johnson et al. | 502/119 |
| 4,634,687 | 1/1987 | Fujita et al. | 502/124 X |
| 4,654,318 | 3/1987 | Yamamoto et al. | 502/124 X |
| 4,710,482 | 12/1987 | Job | 502/127 |
| 4,754,006 | 6/1988 | Murata et al. | 526/124 |
| 4,971,936 | 11/1990 | Wilson et al. | 502/124 |

FOREIGN PATENT DOCUMENTS

| | | |
|---|---|---|
| 1146699 | 5/1983 | Canada . |
| 0157472 | 10/1985 | European Pat. Off. . |
| 0206753 | 6/1986 | European Pat. Off. . |
| 67016054 | 2/1967 | Japan . |
| 855753 | 12/1960 | United Kingdom . |
| 1486194 | 12/1973 | United Kingdom . |
| 1554340 | 6/1977 | United Kingdom . |

OTHER PUBLICATIONS

Polymer Science Determination, James C. Randall, 1977.
Macromol. Rev. 2, Syndiotactic Polypropylene, E. A. Youngman and J. Boor, Jr.
Makromol. Chem., Stereochemical Structure and Molecular Weight Distribution of Polypropylenes, Yoshiharu et al.
Thermoplastic Elastomers, C. K. Shih, A. C. L. Su, Hanser Publishers, Munich Vienna New York.

Primary Examiner—Patrick P. Garvin
Attorney, Agent, or Firm—Donald F. Haas

[57] ABSTRACT

A process and a catalyst for the production of elastomeric primarily isotactic polyolefins characterized by short average blocks lengths wherein olefins are polymerized in the presence of the catalyst which comprises the reaction product of a magnesium alkoxide and a tetravalent titanium halide which takes place in the presence of an electron donor, an organoaluminum compound, and a selectively control agent which is an effectively hindered heterocyclic aromatic nitrogen compound wherein the hindrance is provided by a chloro or a methoxy group.

6 Claims, No Drawings

PROCESS FOR THE PRODUCTION OF ELASTOMERIC PRIMARILY ISOTACTIC POLYOLEFINS AND CATALYSTS FOR USE IN SAID PROCESS

This is a division, of application Ser. No. 484,314, filed Feb. 26, 1990, now Pat. No. 5,089,573.

BACKGROUND OF THE INVENTION

This invention relates to a process for the production of elastomeric, primarily isotactic polymers and to a catalyst which can be used in such process.

U.S. Pat. No. 4,335,225, issued Jun. 15, 1982, discloses a fractionable elastic polypropylene which is said to have an isotactic content of 55% or less and also to contain some sydiotactic and atactic polypropylene. This patent, and its companions on the catalyst system for making this elastic polypropylene, contain much information about elastic-type polypropylene compositions, although the researchers at Motecatini, especially including Giulio Natta, produced some polypropylene compositions which exhibited some of the characteristics of elastomeric compositions. Specifically, U.S. Pat. Nos. 3,175,999, 3,257,370 and 3,258,455 disclose polypropylene compositions which have some elastic-type properties.

Elastic polypropylene is different from the "normal" or more well known polypropylenes. These more well known types are crystalline and amorphous polypropylenes. It is normally accepted that crystalline polypropylene generally has the isotactic and syndiotactic structure and that amorphous polypropylene generally has considerable atactic structure. Giulio Natta's U.S. Pat. Nos. 3,112,300 and 3,112,301 describe isotactic polypropylene and give structural formulae for isotactic and syndiotactic polypropylene. The former is a straight chain of propylene units wherein the methyl groups are all aligned on one side of the polymer chain. In the latter, the methyl groups alternate from one side of the chain to the other. In atactic polypropylene, the methyl groups are arranged randomly on the two sides of the chain.

Almost all of the polypropylene which is used commercially is crystalline isotactic polypropylene. These products are well known and have been the subject of many patents and articles. Amorphous polypropylenes, which have very little strength, are used commercially primarily in adhesives and asphalt additives.

SUMMARY OF THE INVENTION

The present invention relates to a catalyst which is useful in the production of elastomeric, primarily isotactic polymers of olefins, especially propylene and butene. The catalyst component comprises the reaction product of a magnesium alkoxide compound, which may be of the formula $MgR_1R_2$, where $R_1$ is an alkoxide or aryl oxide group and $R_2$ is an alkoxide or aryl oxide group or halogen, and a tetravalent titanium halide wherein the reaction takes place in the presence of an electron donor. The catalyst is completed by an organoaluminum compound and a selectivity control agent which is an effectively hindered heterocyclic aromatic nitrogen compound wherein the hindrance is provided by a chloro or methoxy group.

DETAILED DESCRIPTION OF THE INVENTION

The "normal" well known polypropylenes discussed above are generally high molecular weight materials which consist of blocks of monomer units of relatively or extremely long average isotactic block length ($<Liso>$), for example, 50 to 200 monomer units. The prior art isotactic polymers (prepared via a $MgCl_2$ supported catalyst) of short average isotactic block length (about 6 to 15 monomer units) normally contain a wide distribution of polymer blocks of varying lengths and are characterized by having relatively low tensile strength and being tacky to the touch.

The polyolefin compositions of the present invention are specifically characterized in that they have a narrow distribution of relatively short block lengths and may be characterized as being of relatively high tensile strength and non-tacky to the touch. By "block lengths" it is meant the number of recurring monomer, in this case propylene, units which, on the average, occur before there is a defect in the polymer chain. By "defect" it is meant that the symmetry of the recurring units is ended and there may begin a different structure (i.e. a change from isotactic to syndiotactic) or units of another monomer may be placed therein. It is theorized that the average block length, as determined by a numerical integration of the pentads which occur in the $^{13}C$ NMR spectrum, has a great effect on the properties of the polymer. For instance, relatively short average isotactic block lengths, i.e. about 8 to 15 or even a little longer, tend to occur in a flexible and rubbery polymer which exhibits good elastic properties and is relatively strong (with tensile strengths of about 1500 to 3000 psi). On the other hand, isotactic block lengths of greater than about 50 are characteristic of commercial, very stiff, highly crystalline isotactic polypropylene.

U.S. Pat. No. 4,335,225, discussed above, discloses how to make an elastomeric polypropylene composition which contains up to 55%, and preferably much less, isotactic polypropylene. This polypropylene has an inherent viscosity of 1.5 to 8, a major melting point between 135° and 155° C., exhibits no yield point, has a tensile set not exceeding 150% and contains 10 to 80% by weight of a diethyl ether-soluble fraction which has an inherent viscosity exceeding 1.5 wherein said fraction has an isotactic crystalline content of about 0.5% to about 5% by weight. A special catalyst, which is the subject of several other related patents, is said to be required to make this material. These catalysts are homogeneous zirconium or hafnium catalysts supported upon partially hydrated alumina. Such catalyst systems are difficult to work with, have extremely low productivities (on the order of 1-2% of the productivities of the catalysts of this invention) and are not used commercially to any appreciable extent.

The polyolefins of the present invention are made with a well known type of catalyst for which there is a wealth of commercial experience and knowledge. The catalyst is comprised of the reaction product of a magnesium alkoxide compound, which may be of the formula $MgR_1R_2$, where $R_1$ is an alkoxy or aryl oxide group and $R_2$ is an alkoxide or an aryl oxide group or halogen, and a tetravalent titanium halide wherein the reaction takes place in the presence of an electron donor and, optionally, a halogenated hydrocarbon. Such catalysts are well known and have been used for several years commercially. The catalyst is completed by the addition of organoaluminium compound and a selectivity control agent which is a hindered heterocyclic aromatic nitrogen compound wherein the hindrance is provided by a chloro or methoxy group.

Examples of halogen containing magnesium compounds that can be used as starting materials for the halogenating reaction are alkoxy and aryloxy magnesium halides, such as isbutoxy magnesium chloride, ethoxy magnesium bromide, phenoxy magnesium iodide, cumyloxy magnesium bromide and napthenoxy magnesium chloride.

Preferred magnesium compounds to be halogenated are selected from magnesium dialkoxides and magnesium diaryloxides. In such compounds the alkoxide groups suitable have from 1 to 8 carbon atoms, and preferably from 2 to 8 carbon atoms. Examples of these preferred groups of compounds are magnesium, di-isopropoxide, magnesium diethoxide, magnesium dibutoxide, magnesium diphenoxide, magnesium dinaphthenoxide and ethoxy magnesium isobutoxide. Magnesium alkoxides disclosed in U.S. Pat. No. 4,710,482, issued Dec. 1, 1987 to Robert C. Job, are also preferred for use herein. Especially preferred is $Mg_4(OCH_3)_6(CH_3OH)_n X_2$ where X is resorcinol or a substituted resorcinol monoanion and n is a number which preferably is 10.

Magnesium compounds comprising one alkyl group and one alkoxide or aryloxide group can be employed, as well as compounds comprising one aryl group and one alkoxide or aryloxide group. Examples of such compounds are phenyl magnesium phenoxide, ethyl magnesium butoxide, ethyl magnesium phenoxide and naphthyl magnesium isoamyloxide.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e. yielding magnesium halides in which the atomic ratio of halogen to magnesium is at least 1.5. Except in cases where phenoxides (e.g. resorcinol) are used, the most preferred reactions are those leading to fully halogenated reaction products. Such halogenation reactions are suitably effected by employing a molar ratio of magnesium compound to titanium compound of 0.005:1 to 2:1, preferably 0.01:1 to 1:1. These halogenation reactions are conducted in the additional presence of an electron donor. An inert hydrocarbon or halohydrocarbon diluent or solvent may be used as a partial substitute for the titanium compound.

Suitable halides of tetravalent titanium include aryloxy- or alkoxy-di and -trihalides, such as dihexanoxy-titanium dichloride, diethoxy-titanium dibromide, isopropoxy-titanium tri-iodide and phenoxy-titanium trichloride. Titanium tetrahalides are preferred. Most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,1-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,1-trichloroethane are preferred aliphatic halohydrocarbons. Aromatic halohydrocarbons may also be employed, e.g., chlorobenzene, bromobenzene, dichlorobenzene, dichlorodibromobenzene, naphthyl chloride, chlorotoluene, dichlorotoluenes, and the like; chlorobenzene and dichlorobenzene are preferred aromatic halohydrocarbons. Chlorobenzene is the most preferred halohydrocarbon.

The halogenation normally proceeds under formation of a solid reaction product which may be isolated from the liquid reaction medium by filtration, decantation or another suitable method. It may be subsequently washed with an inert hydrocarbon diluent, such as n-hexane, isooctane or toluene, to remove any unreacted material, including physically adsorbed halohydrocarbon.

The product is also contacted with a tetravalent titanium compound such as a dialkoxy-titanium dihalide, alkoxy-titanium trihalide, phenoxy-titanium trihalide or titanium tetrahalide. The most preferred titanium compounds are titanium tetrahalides and especially titanium tetrachloride. This treatment increases the chloride content of the solid catalyst component. This increase should preferably be sufficient to achieve a final chlorine atomic ratio of greater than 90% of the ionic equivalents of magnesium plus titanium present in the solid catalyst component. To this purpose the contacting with the tetravalent titanium compound is most suitably carried out at a temperature of from 60° to 136° C. during 0.1-6 hours, optionally in the presence of an inert hydrocarbon diluent. Particularly preferred contacting temperatures are from 70° to 120° C. and the most preferred contacting periods are in between 0.5 to 3.5 hours. The treatment may be carried out in successive contacts of the solid with separate portions of $TiCl_4$.

After the treatment with tetravalent titanium compound the catalyst component is suitably isolated from the liquid reaction medium and washed to removed unreacted titanium compound. The titanium content of the final, washed catalyst constituent is suitably between about 1.5 to 3.6 percent by weight or up to about 4.5 percent. The preferred halogen atom, possibly contained in the magnesium compound to be halogenated, and contained in the titanium compound which serves as halogenating agent and in the tetravalent titanium compound with which the halogenated product is contacted, is chlorine.

The material used to wash the catalyst component is an inert, light hydrocarbon liquid. Preferred light hydrocarbon liquids are aliphatic, alicyclic and aromatic hydrocarbons. Examples of such liquids include isopentane, n-hexane, iso-octane and toluene, with iso-pentane being most preferred. The amount of light hydrocarbon liquid employed is 5 to 100 cc/gm of procatalyst in each of 2 to 6 separate washes, preferably about 25 cc/gm. The resulting solid component is the procatalyst, which is used with cocatalyst and selectivity control agent in the polymerization process.

Suitable electron donors are ethers, esters, ketones, phenols, amines, amides, imines, nitriles, phosphines, silanes, phosphites, stibines, arsines, phosphoramides and alcoholates. Examples of suitable donors are those referred to in U.S. Pat. No. 4,442,276. Preferred donors are esters. Preferred esters are esters of aliphatic and aromatic dicarboxylic acids, such as dimethyl carbonate, dimethyl adipate, dihexyl fumarate, dibutyl maleate, ethylisopropyl oxalate, diethyl phthalate and diisobutyl phthalate. Preferred electron donors for use in preparing the titanium constituent are the dialkylphthalates.

The primary organoaluminum compound to be employed as cocatalyst may be chosen from any of the known activators in olefin polymerization catalyst systems comprising a titanium halide but is most suitably free of halogens. While aluminum trialkyl compounds, dialkylaluminum halides and dialkylaluminum alkoxides may be used, aluminumtrialkyl compounds are preferred, particularly those wherein each of the alkyl groups has 1 to 6 carbon atoms, e.g., aluminumtrimethyl, aluminumtriethyl, aluminumtri-n-propyl, aluminumtri-isobutyl, aluminumtri-isopropyl and aluminumdibutyl-n-amyl. Alternatively, these may be used in combination with various alkyl aluminum halides, e.g. diethyl aluminum chloride. Preferred proportions of selectivity control agent, employed separately, in combination with, or reacted with an organoaluminum compound, calculated as mol per mol titanium compound, are in the range from 1 to 100 particularly from 10 to 80.

The selectivity control agents which are necessary to achieve the advantages of the present invention are effectively hindered heterocyclic aromatic nitrogen compounds which are capable of serving as electron donors and wherein the hindrance is provided by a chloro or methoxy group. By "effectively" hindered it is meant that these compounds must be sterically or electronically hindered with the chloro or methoxy group to a sufficient extent so that they will produce elastomeric, primarily isotactic polypropylene which has a high degree of elasticity even when compared to syndiotactic elastomeric polypropylenes and a higher elasticity than the so called mildly elastomeric primarily isotactic polypropylenes.

Generally, sufficient or "effective" hindrance is provided by the chloro or methoxy constituent group or groups which are attached to the carbon atoms located on either side of the nitrogen atom in the aromatic ring. Specific examples are 2,6-dichloropyridine, 2-chloroquinoline, 2-chloro-6-methoxypyridine, 2,3-dichloroquinoxaline, 2,4,6-trichloropyrimidine, 2,4,5,6-tetra-chloropyrimidine, 2-chlorolepidine and 6-chloro-2-picoline.

To prepare the final polymerization catalyst composition, procatalyst, cocatalyst and selectivity control agent may be simply combined, most suitably employing a molar ratio to produce in the final catalyst an atomic ratio of aluminum to titanium of from 1 to 150, and suitably from about 10 to about 150. The catalyst of this invention tends to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to slightly increase catalyst activity at the expense of increased catalyst residue in the unextracted product. These factors will be considered in selecting the Al:Ti ratio for any given process and desired product. In general, Al:Ti ratios in the range of 30:1 to 100:1 and especially of about 50:1 to 80:1 will be found advantageous. SCA:Ti ratios of about 10:1 to 100:1 may be used.

Polymerization of propylene may be conducted with the catalysts of the invention in a liquid system with an inert diluent such as a paraffinic liquid of 3 to 15 carbon atoms per molecule, or in a liquid system containing propylene as sole diluent or together with a small amount of propane, or in vapor phase. Propylene polymerization in liquid phase is conducted at a temperature of 50° to 80° C. and at a pressure sufficient to maintain liquid conditions. In a continuous reaction system, the liquid in the reaction zone is maintained at reaction conditions, monomer is continuously charged to the reaction zone, catalyst components are also charged continuously or at frequent intervals to the reaction zone, and reaction mixture containing polymer is withdrawn from the reaction zone continuously or at frequent intervals.

In propylene polymerization, the reaction mixture is typically maintained at conditions at which the polymer is produced as a slurry in the reaction mixture. The catalyst systems of this invention are extremely active and highly specific in propylene polymerization, so that no removal of catalyst components or of atactic polymer from the polymer product is required.

While the catalysts of this invention are particularly adapted for use in continuous polymerization systems, they may, of course, also be employed in batch polymerization. This may be of advantage in a multi-stage polymerization in which olefin polymers and copolymers are produced in separate reaction zones arranged in sequence.

It is well known that supported coordination procatalysts and catalyst systems of the type used herein are highly sensitive, in varying degrees, to catalyst poisons such as moisture, oxygen, carbon oxides, polyolefins, acetylenic compounds and sulfur compounds. It will be understood that in the practice of this invention, as well as in the following examples, both the equipment and the reagents and diluents are carefully dried and free of potential catalyst poisons.

The productivity of the procatalyst is determined as kg polymer/g procatalyst in a standard one hour batch reaction; it may also be expressed as kg polymer/g Ti. Catalyst activity is sometimes reported as kg polymer/g procatalyst or Ti/hr.

The specificity towards production of syndiotactic polymer and towards average block length is determined by measurements involving the pentads observed in the $^{13}$C NMR spectrum. (See "Polymer Sequence Determination, Carbon-13 NMR Method" by James C. Randall, Academic Press, NY 1977.) A relationship has been determined such that the average block length may be estimated by measuring the amount of xylene soluble polymer (XS) in accordance with regulations of the U.S. Food and Drug Administration. The XS test is carried out as follows: The sample is completely dissolved in xylene in a stirred flask by heating at 120° C. The flask is then immersed in a water bath at 25° C. without stirring for one hour, during which the insoluble portion precipitates. The precipitate is filtered off and the solubles present in the filtrate are determined by evaporing a 20 ml aliquot of the filtrate, drying the residue under vacuum, and weighing the residue. The xylene-solubles increases for short block length material and may include some amorphous and low molecular weight crystalline material. (FDA regulations 121.2501 and 121.2510, 1971). The desirable numerical value of XS for the propylene homopolymers of this invention is typically between about 35% and about 85%.

PREPARATION OF PROCATALYSTS USED IN THIS INVENTION

Magnesium methoxide solution (12%) was prepared by dissolving magnesium metal in methanol containing 0.125 equivalent of tetraethoxy silane (TEOS) and then filtering through a medium porosity fritted glass filter to remove the slight amount of grey suspension.

The magnesium methoxide solution (791 g, 1.10 mol) was added slowly, at 60° C., to a solution of resorcinol (60.5 g, 0.55 mol) in methanol (175 g) while stirring at 450 rpm with a 3 inch wide, curved teflon paddle of 1.5 in² surface area. By the time ⅓ of the methoxide had been added the flocculant precipitate had gotten quite viscous so another 155 g of methanol was added. After addition was complete the reaction was stirred for an hour then filtered. The solids were washed with methanol then dried under moving nitrogen to yield crystalline cylindrical rods of formula: $Mg_4(OCH_3)_6(CH_3OH)_{10}(resorcinolate)_2$. Partial desolvation of this precursor was carried out by boiling 40 g of solids in 300 g of cyclohexane, containing 120 g of tetraethoxysilane, until the volume had decreased by 20–30%.

The procatalyst was prepared by stirring 7.8 g of the partially desolvated precursor in 200 ml of a 50/50 (vol/vol) mixture of $TiCl_4$/chlorobenzene. After adding isobutylphthalate (2.5 ml, 8.7 mmol) the mixture was heated in an oil bath and stirred at 115° C. for 60 minutes. The mixture was filtered hot and the solids slurried in 200 ml of fresh $TiCl_4$/chlorobenzene mixture. Phthaloyl chloride (0.5 ml, 3.4 mmol) and p-toluoyl chloride (0.5 ml, 3.7 mmol) were added and the mixture stirred at 115° C. After 60 minutes the mixture was filtered hot and the solids slurried again into 200 ml of fresh $TiCl_4$/chlorobenzene mixture, heated at 115° C. for 30 min and filtered hot. The solids were then slurried into 100 ml of fresh $TiCl_4$/chlorobenzene mixture, heated at 115° C. for 10 minutes and filtered hot. The solids were allowed to cool then washed with six 150 ml portions of isopentane and dried for 100 minutes under moving nitrogen at 40° C. Ti = 2.54%.

EXAMPLES

The cocatalyst used was triethylaluminum as a 0.28 molar solution in isooctane. 0.20 millimoles of the selectivity control agent, 0.01 mmol of the procatalyst and 0.7 mmol of the cocatalyst were mixed together and after 20 minutes were injected into 2700 milliliters of liquid propylene in a reactor where the polymerizations were carried out for 90 minutes at 60° C.

$^{13}$C Magnetic Resonance

Spectra were obtained at 135° C. on samples dissolved in 1,2,4-trichlorobenzene. The spectrum reference was the mmmm methyl group assigned at 21.68 ppm. The calculated results of % syndiotactic, % isotactic, % defective and the respective average block lengths, for the boiling isooctane fractionated polymer are shown in Tables 1 and 3.

Pentad Analysis

The pentad analyses for the examples were carried out utilizing the following formulae:

$$\% \text{ Iso} = \frac{mmmm - 1.5\, mmmr}{\text{Total resonances}} \cdot 100 \quad (I)$$

$$L_{iso} = 3 - 2\,(mmmm/mmmr) \quad (II)$$

$$\% \text{ Syn} = \frac{rrrr - 1.5\, rrrm}{\text{Total resonances}} \cdot 100 \quad (III)$$

$$L_{syn} = 3 - 2\,(rrrr/rrrm) \quad (IV)$$

% defects is calculated by difference from 100%.

Tensile Properties

In order to prepare samples for tensile measurements, about 60 g of the polymer was blended in a Brabender mixer at 190° C. with 0.3 g of Irganox 1010 antioxidant. After cooling, a 6″×6″×2 mm plate was compression molded at 204° C. under 5 tons pressure. Tensile bars were then cut from the plate using a 'C' die. The measurement conditions are as described in ASTM D 412-83. Roughly: Tensile set is the residual elongation imparted to a sample after stretching to an increase of 300% over its original length at a rate of 20 inches/minute and then allowing it to recover to zero load at that same rate. Tensile yield is the stress required to induce a permanent deformation in the sample. Tensile at break is the stress required to break the sample at an elongation rate of 20 inches/minute. Elongation at break is the measured elongation at the break condition.

Melt flow index was determined under condition L (2160 g, 230° C.) on a Tinius Olsen Plastometer. The strands, which were formed by extrusion through the 3 mm die of the melt flow device, were stretched to an equilibrated length by hand pulling to nearly the break point several times. The elasticity of the polymer is reported as the percentage elongation obtained upon applying a force nearly enough to break the strand (after which, of course, the strand returns to its equilibrated length). This measurement is essentially equivalent to the reversible elastic elongation described by G. Natta and G. Crespi in U.S. Pat. No. 3,175,999.

The analytical results of these experiments are shown in Table 1 set forth below. The table gives the percentage of isotactic and syndiotactic content as determined by $^{13}$C NMR analysis as well as the xylene soluble percentage in the polymer produced. Since each of these polymers contains significant amounts of both isotactic and syndiotactic blocks, I have included the average isotactic block length ($L_{iso}$), the average syndiotactic block length ($L_{syn}$) and an average crystalline block length ($L_{ave}$) which is the weighted average of the other two. In each case, the polymer contains a smaller percentage of syndiotactic material than isotactic material and the residual stretch values (a measure of elasticity) are greater than 50% and the xylene solubles contents are greater than 60%.

TABLE 1

| | | Cl⁻ and ⁻OMe Group Nitrogen Heterocycles | | | | | | |
|---|---|---|---|---|---|---|---|---|
| Ex. | SCA | Effectively Hindered (Yes or No) | % Iso | <Liso> | % Syn | <Lsyn> | X.S. | Stretch |
| 1 | 2-chloro-6-methoxypyridine | Y | 42 | 11 | 35 | 7.2 | 62.5 | — |
| 2 | 3,4,5-trichloropyridazine | N | 76 | 27 | 12 | 6.5 | 20.3 | 14% |
| 3 | 3,4,5-trichloropyridazine | N | 72 | 21 | 15 | 6.8 | 30.7 | 14% |
| 4 | 4,6-dichloropyrimidine | N | 74 | 23 | 14 | 6.8 | 28.6 | 6% |
| 5 | 2,4,6-trichloropyrimidine | Y | 50 | 11 | 27 | 6.5 | 59.9 | 70% |

TABLE 1-continued

| | | Cl and OMe Group Nitrogen Heterocycles | | | | | | |
|---|---|---|---|---|---|---|---|---|
| Ex | SCA | Effectively Hindered (Yes or No) | % Iso | <Liso> | % Syn | <Lsyn> | X.S. | Stretch |
| 6 | 2,4-dichloropyrimidine | N | 58 | 17 | 25 | 7.8 | 46.8 | 26% |
| 7 | 2,4,5,6-tetrachloropyrimidine | Y | 62 | 15 | 18 | 6.3 | 45.4 | 34% |
| 8 | 2,3-dichloroquinoxaline | Y | 53 | 14 | 28 | 7.2 | 48.2 | 28% |
| 9 | 2-chlorolepidine | Y | 40 | 13 | 39 | 8.0 | 65.6 | 82% |
| 10 | cyanuric chloride | Y (reactive) | 74 | 20 | 12 | 6.6 | 28.3 | 18% |
| 11 | 6-chloro-2-picoline | Y | 39 | 10 | 36 | 7.5 | 72 | 240% |
| 12 | 2,6-dichloropyridine | Y | 47 | 11 | 28 | 7.0 | 72.7 | 66% |
| 13 | 2,6-dichloropyridine | Y | 45 | 10 | 30 | 7.0 | 70.3 | 79% |

All of the hindered SCA's produce polymer with relatively short block lengths (10-15) and relatively high stretch (28-240%) while the unhindered SCA's produce polymer with longer block lengths (17-27) and relatively low stretch (6-26%). Cyanuric chloride is thought to be too reactive to serve as an effective electron donor. Examples 4 and 6 (unhindered) and 5 and 7 (hindered) utilize very similar nitrogen compounds and yet the hindered ones produce the desired polymer whereas the polymers produced with the unhindered ones produce polymer with higher block lengths and lower stretch. The tensile properties of some of the polymers made according to the present invention are shown in Table 2.

TABLE 2

| Example | Tbreak (psi) | Tset (%) | Tyield (psi) | Elongation at break (%) |
|---|---|---|---|---|
| 1 | 1998 | 95 | 752 | 872 |
| 7 | 2630 | 190 | 1586 | 743 |
| 9 | 1943 | 98 | 977 | 767 |
| 11 | 1674 | 98 | 723 | 706 |
| 12 | 2222 | 87 | 703 | 894 |
| 13 | 2196 | 93 | 643 | 873 |

For comparative purposes, several examples of SCA's with hindering methyl groups were used to polymerize propylene under similar conditions. The NMR results are shown in Table 3 and the tensile properties in Table 4.

TABLE 3

| | | Methyl Group Hindered Nitrogen Heterocycles | | | | | |
|---|---|---|---|---|---|---|---|
| Example | SCA | % Iso | <Liso> | % Syn | <Lsyn> | X.S. | Stretch |
| A | 2,3-dimethylquinoxaline | 34 | 13 | 45 | 8.0 | 61.4 | 58% |
| B | 2,4-dimethylquinoline | 37 | 13 | 45 | 8.4 | 61.3 | 78% |
| C | 2,6-lutidine | 25 | 10 | 54.5 | 8.7 | 67.6 | 68% |

All produce primarily syndiotactic polymer whereas the SCA's of the present invention produce primarily isotactic polymer. The SCA's of examples A, B and C differ from those of 8, 9 and 12 (and 13) only in that a methyl group has replaced the hindering chloro group and yet one group leads to primarily syndiotactic and the other to primarily isotactic polymer.

TABLE 4

| Example | Tbreak (psi) | Tset (%) | Tyield (psi) | Elongation at break (%) |
|---|---|---|---|---|
| A | 2089 | 99 | 914 | 876 |
| B | 2385 | 121 | 1049 | 846 |
| C | 1554 | 41 | 730 | 750 |

1.8 liters of 1-butene was polymerized with 2 different SCA's at the same conditions as above. The results shown in Table 5 show that the Cl[31] hindered SCA (Ex. 14) produces primary isotactic polybutylene while the methyl hindered SCA (Ex. D) produces primarily syndiotactic polybutylene.

TABLE 5

| Example | SCA | % Iso | <Liso> | % Syn | <Lysn> |
|---|---|---|---|---|---|
| 14 | 2,6-dichloropyridine | 56% | 13 | 18% | 6.1 |
| D | 2,6-lutidine | 27% | 10 | 38% | 6.9 |

What is claimed is:

1. A catalyst for use in the polymerization to elastomeric primarily isotactic polyolefins characterized by short average block lengths which comprises:
   (a) The reaction product of a magnesium alkoxide and a tetravalent titanium halide wherein the reaction takes place in the presence of an electron donor.
   (b) An organoaluminum compound, and
   (c) A selectivity control agent which is selected from the group consisting of 2,6-dichloropyridine, 2-chloroquinoline, 2-chloro-6-methoxy pyridine, 2,3-dichloroquinoxaline, 2,4,6-trichloropyrimidine, 2,4,5,6-tetrachloropyrimidine, 2-chlorolepidine and 6-chloro-2-picoline.

2. The catalyst of claim 1 wherein the tetravalent titanium halide is titanium tetrachloride.

3. The catalyst of claim 2 wherein the magnesium alkoxide is a compound of the formula $MgR_1R_2$, where $R_1$ is an alkoxide or aryl oxide group and $R_2$ is an alkoxide or aryloxide or halogen.

4. The catalyst of claim 3 wherein both $R_1$ and our $R_2$ are ethoxide.

5. The catalyst of claim 2 wherein the magnesium alkoxide is a magnesium compound of the formula $[Mg_4(OR_3)_6(R_4OH)_{10}]X$ where X is a couterion or ions having a total charge of $-2$ and $R_3$ and $R_4$, which may be the same or different, are selected from alkyl groups of 1 to 4 carbon atoms.

6. The catalyst of claim 5 wherein $R_3$ and $R_4$ are methyl groups and X is resorcinol or a substituted resorcinol monoanion.

* * * * *